(12) United States Patent
Chou

(10) Patent No.: US 8,681,434 B2
(45) Date of Patent: Mar. 25, 2014

(54) ZOOM LENS

(75) Inventor: Hsiang-Ho Chou, New Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 52 days.

(21) Appl. No.: 13/431,152

(22) Filed: Mar. 27, 2012

(65) Prior Publication Data
US 2013/0010372 A1 Jan. 10, 2013

(30) Foreign Application Priority Data
Jul. 6, 2011 (TW) .............. 100123919 A

(51) Int. Cl.
*G02B 15/14* (2006.01)
*G02B 15/177* (2006.01)

(52) U.S. Cl.
CPC .................... *G02B 15/177* (2013.01)
USPC ........................... 359/689; 359/676

(58) Field of Classification Search
USPC .................. 359/676, 689
See application file for complete search history.

(56) References Cited

U.S. PATENT DOCUMENTS

| 2005/0200970 A1 | 9/2005 | Nose et al. |
| 2005/0259331 A1 | 11/2005 | Satori |
| 2009/0009883 A1 | 1/2009 | Wada |
| 2010/0033842 A1 | 2/2010 | Kakimoto |
| 2012/0162768 A1* | 6/2012 | Kuzuhara et al. ............ 359/557 |

FOREIGN PATENT DOCUMENTS

| JP | 2009-92740 | 4/2009 |
| TW | M309675 U | 4/2007 |
| TW | 201037352 | 10/2010 |

* cited by examiner

*Primary Examiner* — Jack Dinh
(74) *Attorney, Agent, or Firm* — Rabin & Berdo, P.C.

(57) ABSTRACT

A zoom lens is provided. The zoom lens includes a first lens group, a second lens group and a third lens group. The first lens group includes at least one lens. The second lens group includes at least one lens. The first lens group, the second lens group and the third lens group are arranged in order from an object side to an image side. The zoom lens satisfies following conditions: $Nd^A<1.65$, $Nd^B<1.65$, and $GD2/GD1<1.35$. $Nd^A$ is a refraction index of the first lens group. $Nd^B$ is a refraction index of the second lens group. GD1 is a thickness of the first lens group along an optical axis. GD2 is a thickness of the second lens group along an optical axis.

18 Claims, 4 Drawing Sheets

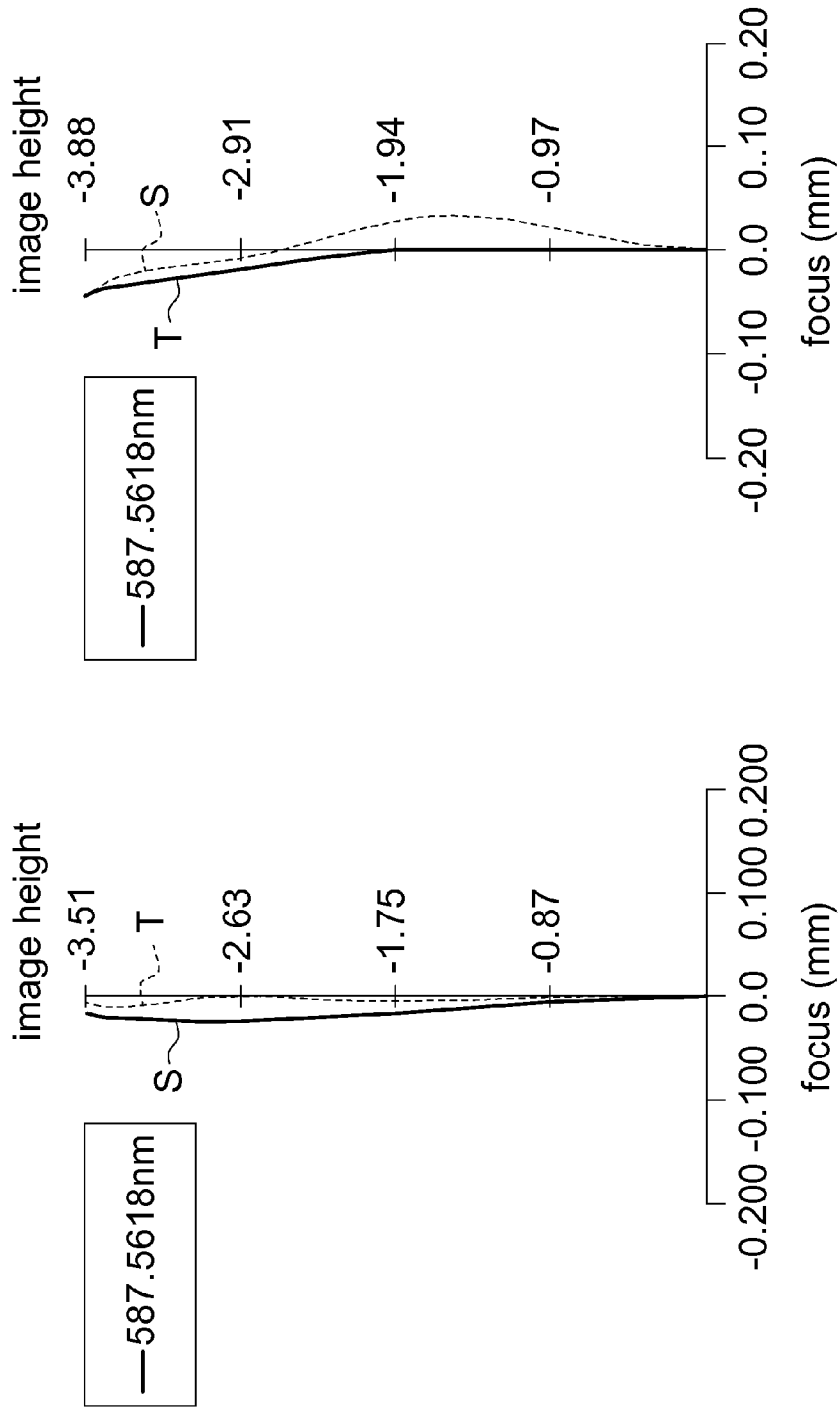

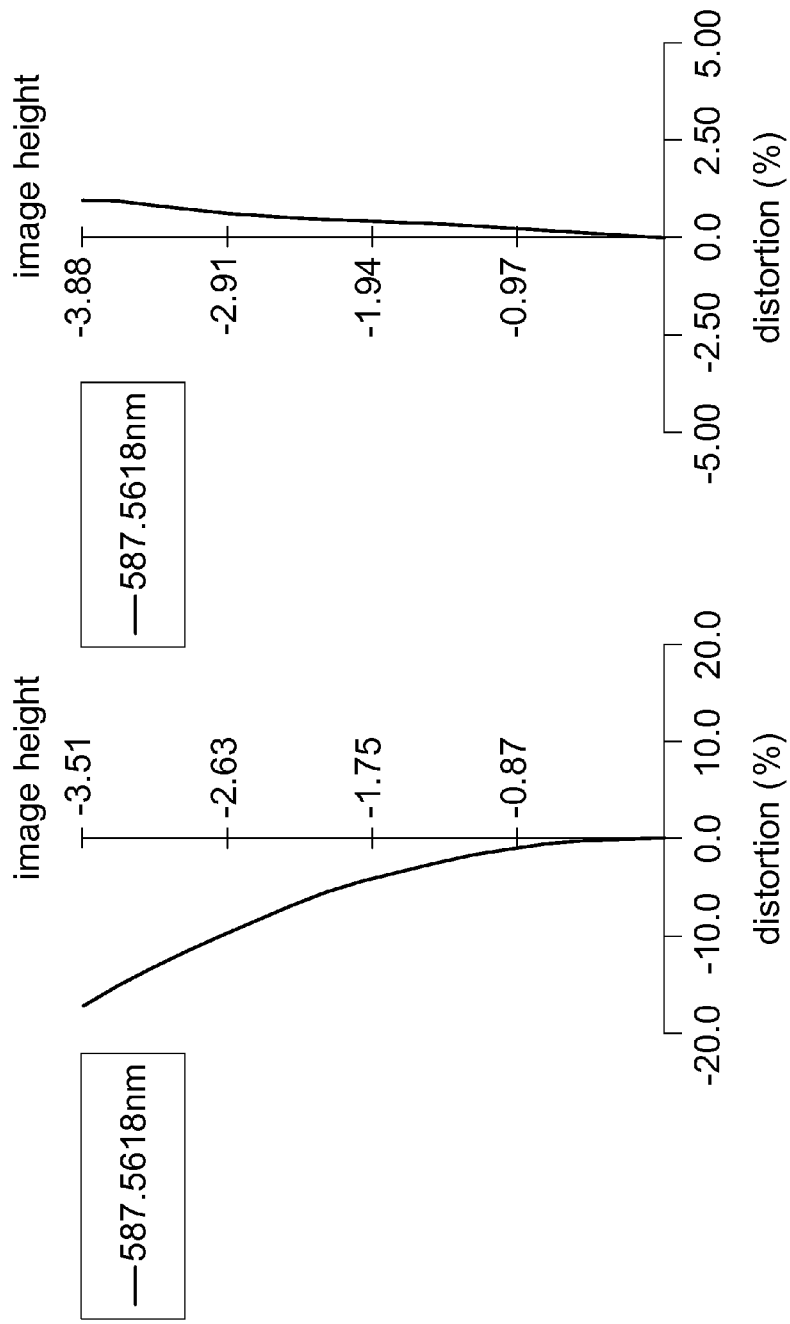

ZOOM LENS

This application claims the benefit of Taiwan application Serial No. 100123919, filed Jul. 6, 2011, the subject matter of which is incorporated herein by reference.

BACKGROUND OF THE INVENTION

1. Field of the Invention

The invention relates in general to an optical lens, and more particularly to a zoom lens.

2. Description of the Related Art

The lens is crucial to the imaging quality of a camera. The lens is mainly divided into the fixed-focus lens and the zoom lens. The zoom lens, having the feature of adjusting the focal length according to the needs, is convenient to use and has gained a great popularity. However, in terms of design and performance, the existing zoom lenses still have many inadequacies and problems that need to be resolved. For example, the zooming rate is restricted to be under 2.3, and the existing zoom lenses are only applicable to smaller apertures. The existing zoom lenses cannot perform exposure with wider apertures, and the sense of stereoscopy still cannot be achieved.

SUMMARY OF THE INVENTION

The invention is directed to a zoom lens, which has a large range of zooming rate and is applicable to wider apertures.

According to a first aspect of the present disclosure, a zoom lens is provided. The zoom lens comprises a first lens group, a second lens group and a third lens group. The first lens group comprises at least one lens. The second lens group comprises at least one lens. The first lens group, the second lens group and the third lens group are arranged in order from an object side to an image side. The zoom lens satisfies following conditions:

$Nd^A < 1.65$ $Nd^B < 1.65$ $GD2/GD1 < 1.35$ $Nd^A$ is a refraction index of the first lens group. $Nd^B$ is a refraction index of the second lens group. GD1 is a thickness of the first lens group along an optical axis. GD2 is a thickness of the second lens group along an optical axis.

According to a first aspect of the present disclosure, a zoom lens is provided. The zoom lens comprises a first lens group with a negative diopterpower, a second lens group with a positive diopterpower, and a third lens group with a positive diopterpower, arranged in order from an object side to an image side. The zoom lens satisfies the following conditions:

$Nd^A < 1.65$ $Nd^B < 1.65$ $GD2/GD1 < 1.35$ $Nd^A$ is a refraction index of an image side lens of the first lens group. NdB is a refraction index of an image side lens of the second lens group. GD1 is a thickness of the first lens group along an optical axis. GD2 is a thickness of the second lens group along the optical axis.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 3A shows a field-curvature curve of a zoom lens in a wide angle end.

FIG. 3B shows a field-curvature curve of a zoom lens in a telephoto end.

FIG. 4A shows a distortion curve of a zoom lens in a wide angle end.

FIG. 4B shows a distortion curve of a zoom lens in a telephoto end.

DETAILED DESCRIPTION OF THE INVENTION

Figure 1:
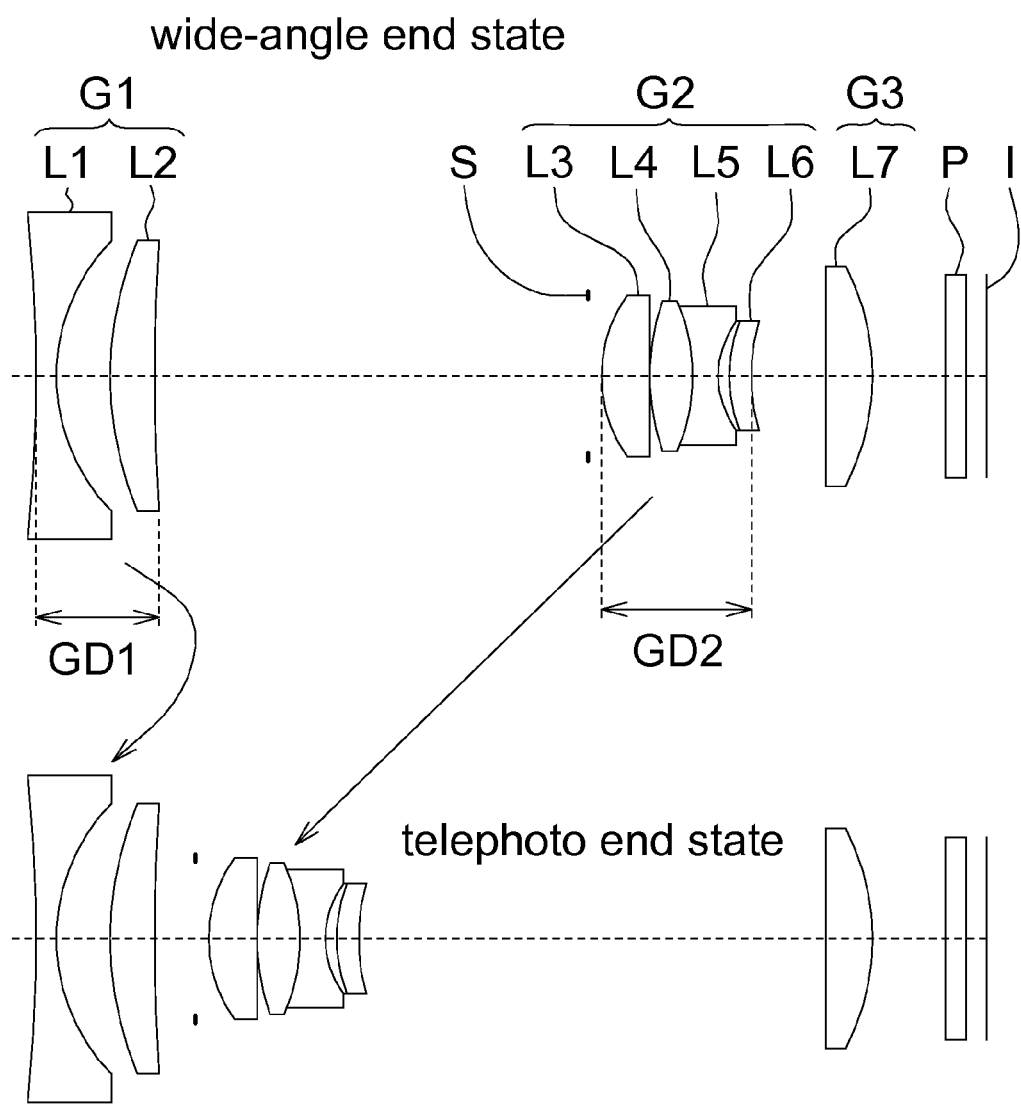
FIG. 1 arrangements for a zoom lens in a wide angle end and in a telephoto end according to one embodiment.

FIG. 1 shows arrangements for a zoom lens in a wide angle end and a in telephoto end according to one embodiment. The zoom lens comprises a first lens group G1, a second lens group G2 and a third lens group G3 arranged in order from an object side to an image side. The first lens group G1 comprises at least one lens with a refraction index being $Nd^A$. The second lens group G2 comprises at least one lens with a refraction index being $Nd^B$. The zoom lens satisfies following conditions:

$Nd^A < 1.65$ $Nd^B < 1.65$ $GD2/GD1 < 1.35$

GD1 is a thickness of the first lens group G1 along an optical axis. GD2 is a thickness of the second lens group G2 along an optical axis.

In one embodiment, the zoom lens satisfying the above conditions also satisfies following conditions:

$3 \leq ft/fw \leq 5$ $FnoT/FnoW > 2.36$ fw is a focal length of the zoom lens in the wide angle end. ft is a focal length of the zoom lens in the telephoto end. FnoT is a f-number of the zoom lens in the telephoto end. FnoW is a f-number of the zoom lens in the wide angle end.

Referring to FIG. 1, in one embodiment, a stop S is disposed between the first lens group G1 and the second lens group G2. A distance between the stop S and the second lens group G2 is fixed. The zoom lens further comprises an imaging surface I and a plate group P. The plate group P comprises a cover glass and a filter disposed in parallel with each other. The filter can use an infra-red filter for filtering off ray other than the visible light. For example, the ray other than the visible light has a wave length smaller than 420 nm or larger than 680 nm.

The first lens group G1 comprises a first lens L1 and a second lens L2 arranged in order from the object side to the image side. In one embodiment, the first lens group G1 has a negative power. The first lens L1 has a negative power and is a double-concave lens. The second lens L2 has the aforementioned refraction index $Nd^A$. The second lens L2 has a positive power and is a convex-concave lens with a convex surface facing the object side. The second lens L2 has at least one aspherical surface or free-form surface. For example, two opposite surfaces are both aspherical surfaces or are both free-form surfaces, or one of the two surfaces is an aspherical surface and the other is a free-form surface.

The second lens group G2 comprises a third lens L3, a fourth lens L4, a fifth lens L5 and a sixth lens L6 arranged in order from the object side to the image side. In one embodiment, the second lens group G2 has a positive power. The third lens L3 has a positive power and is a double-convex lens. The third lens L3 has at least one aspherical surface or free-form surface. For example, two opposite surfaces are both aspherical surfaces or free-form surfaces, or one of the two surfaces is an aspherical surface and the other is a free-form surface. The fourth lens L4 has a positive power and is a double-convex lens. The fifth lens L5 has a negative power and is a double-concave lens. The fourth lens L4 and the fifth lens L5 are glued to form a doublet lens. The sixth lens L6 has a positive power and is a convex-concave lens with a convex surface facing the object side. The sixth lens L6 has the aforementioned refraction index $Nd^B$. The sixth lens L6 has at least one aspherical surface or free-form surface. For example, two opposite surfaces are both aspherical surfaces or free-form surfaces, or one of the two surfaces is an aspherical surface and the other is a free-form surface.

The third lens group G3 may have a positive power. The third lens group G3 comprises a seventh lens L7. In one embodiment, the seventh lens L7 has a positive power and is a double-convex lens. The seventh lens L7 has at least one aspherical surface or one free-form surface. For example, two opposite surfaces are both aspherical surfaces or free-form surfaces, or one of the two surfaces is an aspherical surface and the other is a free-form surface.

In embodiments, for example, the aforementioned aspherical surface lens or free-form surface may be formed by plastics or glass timber. Besides, each free-form surface has at least one continuous smooth curved surface. The aspherical surface of the lens is conformed to following formula:

$$Z = \left[\frac{(C*Y^2)}{1+\sqrt{1-(K+1)C^2Y^2}}\right] + \sum (A_i * Y^i)$$

Z is a distance along the optical axis from a tangent plane to a top of each aspherical surface at height h to the aspherical surface. K is a conic constant; C=1/curvature radius; Y is a lens height. $A_i$ is an i-th order aspherical coefficient.

For example, $\Sigma(A_i*Y_i)=A_4*Y^4+A_6*Y^6+A_8*Y^8+A_{10}*Y^{10}+A_{12}*Y^{12}$ $A_4$ is 4-th order aspherical coefficient. $A_6$ is 6-th order aspherical coefficient. The rest can be obtained by analogy.

In embodiments, the first lens L1, the third lens L3, the fourth lens L4 and the fifth lens L5 are glass timber lenses respectively. The second lens L2 and the sixth lens L6 are plastics lenses respectively. To be more specific, the glass timber lens is formed by a glass material, particularly an optical level glass material manufactured by a method comprising a grinding and polishing process or a glass molding process (GMP). For example, the plastics lens may be formed by, but is not limited to, polycarbonate, cyclic olefin copolymer (such as APEL), and polyester resin (such as OKP4 or OKP4HT, etc., manufactured by an injection molding process.

Referring to FIG. 1, in embodiments, a zooming method for the zoom lens comprises changing a relative distance between the first lens group G1 and the second lens group G2, and fixing the position of the third lens group G3. For example, a method of changing the zoom lens from the wide-angle end to the telephoto end is moving the first lens group G1 towards the image side and then towards the object side, and at the same time moving the second lens group G2 towards the object side. The stop S, separated from the second lens group G2 by a fixed distance, is moved with the second lens group G2. In one embodiment, the third lens group G3 may be a focusing lens moved only during the focusing process.

Parameters and Results of the Zoom Lens in Embodiments

Table 1 shows the powers, the refraction indexes (ND), the Abbe coefficients (VD) and the materials of lenses L1 to L7, and the refraction index, the Abbe coefficient and the material of the plate group P of the zoom lens in embodiments.

TABLE 1

| Element Designation | Power | Refraction Index | Abbe Coefficient | Material |
| --- | --- | --- | --- | --- |
| L1 | −9.355 | 1.729157 | 54.6831 | Glass Timber |
| L2 | 31.079 | 1.636 | 23.9561 | Plastics |
| L3 | 7.7032 | 1.592014 | 67.0227 | Glass Timber |
| L4 | 22.818 | 1.882997 | 40.7643 | Glass Timber |
| L5 | −6.015 | 1.683019 | 30.9634 | Glass Timber |
| L6 | 32.933 | 1.636 | 23.9561 | Plastics |
| L7 | 16.668 | 1.497103 | 81.5596 | Glass Timber |
| P | | 1.51633 | 64.142 | Glass Timber |

Table 2 shows the curvature radiuses, the effective diameters and the distances of the surfaces of lenses L1 to L7, the stop S, the plate group P and the imaging surface I of the zoom lens in embodiments.

TABLE 2

| Element Designation | Surface Designation | Curvature Radius (nm) | Effective Diameter | Distance |
| --- | --- | --- | --- | --- |
| L1 | L1R1 | −64.68972128 | 12.9 | 0.8 |
| | L1R2 | 7.665487663 | 10.66 | 2.131190159 |
| L2 | L2R1 | 14.44585292 | 10.8 | 1.806135099 |
| | L2R2 | 51.05954704 | 10.64 | D1 |
| S | | ∞ | 5.92 | 0.6 |
| L3 | L3R1 | 5.216649255 | 6.46 | 1.989758392 |
| | L3R2 | −31.11170744 | 6.18 | 0.1 |
| L4 | L4R1 | 17.96161512 | 5.98 | 1.579983684 |
| | L4R2 | −7.794940207 | 5.98 | 0 |
| L5 | L5R1 | −7.794940207 | 5.64 | 0.996766833 |
| | L5R2 | 3.505091435 | 4.28 | 0.532113085 |

TABLE 2-continued

| Element Designation | Surface Designation | Curvature Radius (nm) | Effective Diameter | Distance |
|---|---|---|---|---|
| L6 | L6R1 | 6.096043403 | 4.28 | 0.896772567 |
|  | L6R2 | 8.10680135 | 4.2 | D2 |
| L7 | L7R1 | 98.94084637 | 8.6 | 1.858888559 |
|  | L7R2 | −8.987083488 | 8.6 | D3 |
| P |  | ∞ | 11 | 0.8 |
| I |  | ∞ | 11 | 0.8 |

In Table 2, the surface of the lens designated as R1 is the surface close to the object side, and the surface designated as R2 is the surface close to the image side. For example, the surface of the lens L1 facing the object side is designated as L1R1, the surface facing the image side is designated as L1R2, and the rest can be obtained by analogy. The distance of the surface L1R1 is the distance between the surface L1R1 and next the surface L1R2 along the optical path, and the rest can be obtained by analogy. The distance D1 is the distance between the first lens group G1 and the second lens group D2 along the optical path, that is, the distance between the surface L2R2 of the second lens L2 facing the image side and the surface L3R1 of the third lens L3 facing the object side along the optical path, and such distance is adjustable. The adjustable distance D2 is the distance between the second lens group G2 and the third lens group D3 along the optical path. The adjustable distance D3 is the distance between the third lens group G3 and the plate group P.

Table 3 shows 4-th, 6-th, 8-th, 10-th, 12-th order aspherical coefficients of an aspherical surface. In one embodiment, the conic constant K is 0.

TABLE 3

|  | A4 | A6 | A8 | A10 | A12 |
|---|---|---|---|---|---|
| L2R1 | −4.2298723 E−05 | −1.1994731 E−06 | 5.4038163 E−08 | 1.0749625 E−09 | 2.0551330 E−11 |
| L2R2 | −2.2992410 E−04 | −1.9324595 E−06 | 8.4072473 E−08 | −9.7765983 E−10 | 3.1955616 E−11 |
| L3R1 | −4.8674444 E−04 | −4.8461359 E−06 | 1.8869411 E−06 | −1.4099318 E−07 | 0.0000000 E+00 |
| L3R2 | 8.1888517 E−04 | 9.3285041 E−06 | 1.5759287 E−06 | −1.7059464 E−07 | 0.0000000 E+00 |
| L6R1 | −1.4713673 E−03 | −4.3341347 E−04 | 7.2275628 E−05 | −1.9640735 E−05 | 4.6267421 E−07 |
| L6R2 | −1.7463458 E−03 | −4.9266234 E−04 | 1.0263401 E−04 | −2.9152059 E−05 | 2.0135881 E−06 |
| L7R1 | −4.4010721 E−04 | −1.2539935 E−05 | 3.0095180 E−06 | −8.6506033 E−08 | 0.0000000 E+00 |
| L7R2 | 1.7396388 E−04 | −4.2317510 E−05 | 4.6478050 E−06 | −1.1645151 E−07 | 0.0000000 E+00 |

Table 4 shows distance D1, D2 and D3 of the zoom lens in the wide angle end and in the telephoto end designed according to the data in Table 1 to Table 3.

TABLE 4

| Parameter | Wide-Angle End | Telephoto End |
|---|---|---|
| D1 | 17.33368 | 0.8525532 |
| D2 | 2.9154723 | 16.876253 |
| D3 | 2.9197 | 2.44 |

Table 5 shows the focal length (f), the f-number (FNO), the half angle view (ω), the image height (Y) and the total lens length (TL) of the zoom lens in the wide angle end and in the telephoto end designed according to the data in Table 1 to Table 4.

TABLE 5

|  | Wide-Angle End State | Telephoto End State |
|---|---|---|
| Focal length | 5 | 19.0029 |
| F-number | 2.1 | 5.3 |
| Half Angle View | 40.25 | 11.42 |
| Image Height | 3.5 | 3.875 |
| Total Lens Length | 37.6605 | 34.6604 |

Figure 2A:
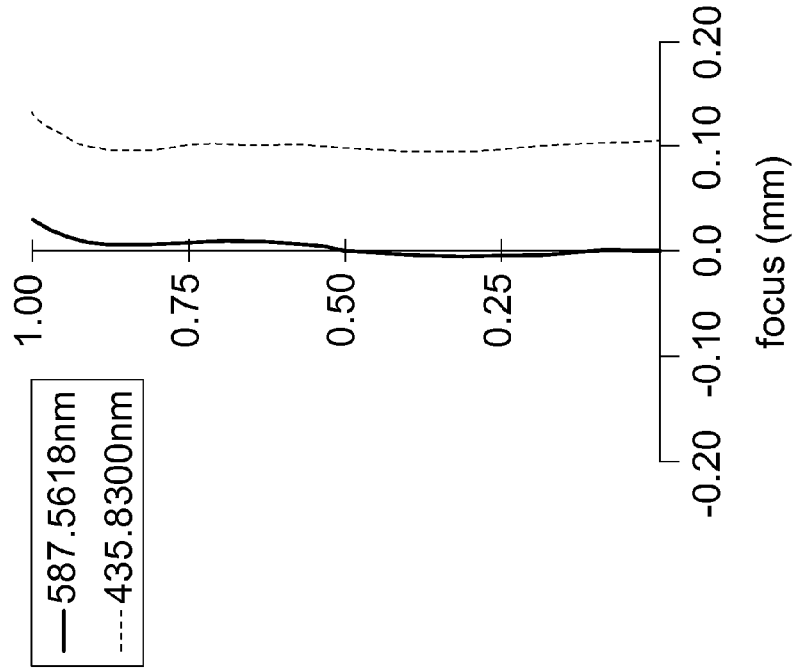
FIG. 2A shows a longitudinal spherical aberration curve of a zoom lens in a wide angle end.
Figure 2B:
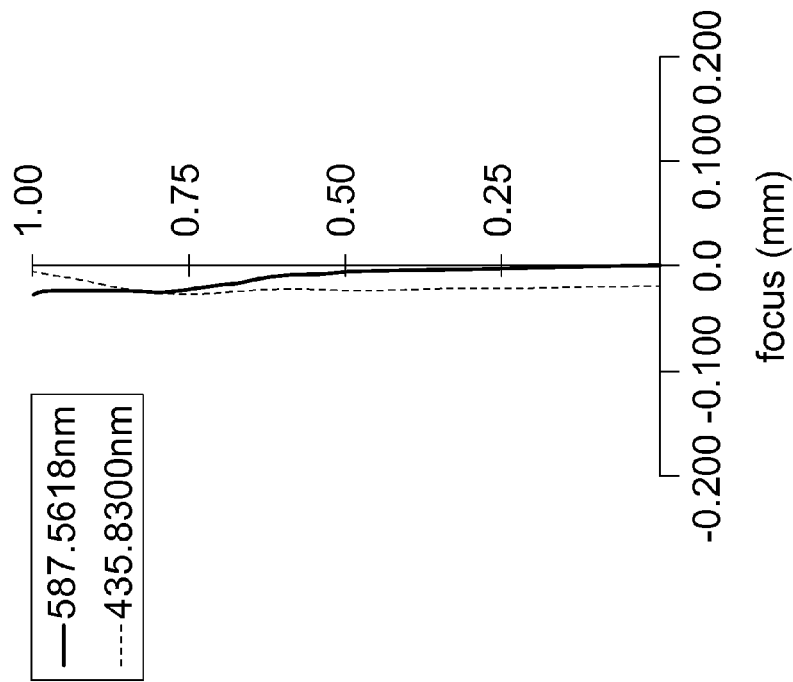
FIG. 2B shows a longitudinal spherical aberration curve of a zoom lens in a telephoto end.

The longitudinal spherical aberration curve of the zoom lens in the wide angle end and in the telephoto end designed according to the data in Table 1 to Table 4 is illustrated in FIG. 2A and FIG. 2B. As indicated in the diagrams, when the zoom lens is in the wide angle end, the longitudinal spherical aberration of the ray with a wave-length being 587.5618 nm and 435.8300 nm is controlled to be within the range of ±0.2 mm. When the zoom lens is in the telephoto end, the longitudinal spherical aberration of the ray with a wave-length being 587.5618 nm and 435.8300 nm is controlled to be within the range of ±0.2 mm.

The field-curvature curve of the zoom lens in the wide angle end and in the telephoto end designed according to the data of Table 1 to Table 4 is illustrated in FIG. 3A and FIG. 3B. The curves T and S respectively show the aberration of the zoom lens with respect to a tangential ray and a sagittal ray. As indicated in the diagrams, when the zoom lens is in the wide angle end, the tangential field-curvature value and the sagittal field-curvature value of the ray with a wave-length being 587.5618 nm are controlled to be within the range of ±0.2 mm. When the zoom lens is in the telephoto end, the tangential field-curvature value and the sagittal field-curvature value are controlled to be within the range of ±0.2 mm.

The distortion curve of the zoom lens in the wide angle end and in the telephoto end designed according to the data of Table 1 to Table 4 is illustrated in FIG. 4A and FIG. 4B. As indicated in the diagram, when the zoom lens is in the wide angle end, the distortion of the ray with a wave-length being 587.5618 nm is controlled to be within the range of −20%~0. When the zoom lens is in the telephoto end, the distortion is controlled to be within the range of ±2%.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A zoom lens, comprising:
a first lens group comprising at least one lens;
a second lens group comprising at least one lens; and
a third lens group;
wherein the first lens group, the second lens group and the third lens group are arranged in order front an object side to an image side, and the zoom lens satisfies following conditions:

$Nd^A<1.65$ $Nd^B<1.65$ $GD2/GD1<1.35$ $FnoT/FnoW>2.36$ $Nd^A$ is a refraction index of the first lens group,
$Nd^B$ is a refraction index of the second lens group,
GD1 is a thickness of the first lens group along an optical axis,
GD2 is a thickness of the second lens group along an optical axis,
FnoT is an f-number of the zoom lens in a telephoto end, and
FnoW is an f-number of the zoom lens in a wide angle end.

2. The zoom lens according to claim 1, wherein the zoom lens satisfies following conditions:

$3 \leq ft/fw \leq 5$ fw is a focal length of the zoom lens in a wide angle end, and
ft is a focal length of the zoom lens in a telephoto end.

3. The zoom lens according to claim 1, wherein the first lens group has a negative power, the second lens group has a positive power, the third lens group has a positive power.

4. The zoom lens according to claim 3, wherein during a zooming process of the zoom lens from a wide-angle end to a telephoto end, the first lens group is moved towards the image side and then is moved towards the object side, and the second lens group is moved towards the object side straightforwardly.

5. The zoom lens according to claim 1, wherein,
the first lens group has a negative power and comprises a first lens and a second lens arranged in order from the object side to the image side;
the second lens group has a positive power and comprises a third lens, a fourth lens, a fifth lens and a sixth lens arranged in order from the object side to the image side; and
the third lens group has a positive power and comprises a seventh lens.

6. The zoom lens according to claim 5, wherein the fourth lens and the fifth lens are glued to form a doublet lens.

7. The zoom lens according to claim 5, wherein the first lens has a negative power, the second lens has a positive power, the third lens has a positive power, the fourth lens has a positive power, the fifth lens has a negative power, the sixth lens has a positive power, and the seventh lens has a positive power.

8. The zoom lens according to claim 5, wherein the first lens is a double-concave lens, the second lens is a convex-concave lens with a convex surface facing the object side, the third lens is a double-convex lens, the fourth lens is a double-convex lens, the fifth lens is a double-concave lens, the sixth lens is a convex-concave lens with a convex surface facing the object side, and the seventh lens is a double-convex lens.

9. The zoom lens according to claim 5, wherein the first lens, the third lens, the fourth lens, the fifth lens and the seventh lens are glass lenses respectively, and the second lens and the sixth lens are plastics lenses respectively.

10. The zoom lens according to claim 5, wherein the second lens, the third lens, the sixth lens and the seventh lens respectively have at least one aspherical surface, at least one free-form surface or have an aspherical surface and a free-form surface.

11. The zoom lens according to claim 1, wherein a lens of the first lens group closest to the image side has the refraction index $Nd^A$, and a lens of the second lens group closest to the image side has the refraction index $Nd^B$.

12. The zoom lens according to claim 1, further comprising a stop disposed between the first lens group and the second lens group.

13. A zoom lens, in order from an object side to an image side, comprising a first lens group with a negative power, a second lens group with a positive power, and a third lens group with a positive power, wherein the zoom lens satisfies following conditions:

$Nd^A<1.65$ $Nd^B<1.65$ $GD2/GD1<1.35$ $FnoT/FnoW>2.36$ $Nd^A$ is a refraction index of an image side lens of the first lens group,
$Nd^B$ is a refraction index of an image side lens of the second lens group,
GD1 is a thickness of the first lens group along an optical axis,
GD2 is a thickness of the second lens group along the optical axis,
FnoT is an f-number of the zoom lens in a telephoto end, and
FnoW is an f-number of the zoom lens in a wide angle end.

14. The zoom lens according to claim 13, the zoom lens satisfies following conditions:

$3 \leq ft/fw \leq 5$ fw is a focal length of the zoom lens in a wide angle end, and
ft is a focal length of the zoom lens in a telephoto end.

15. The zoom lens according to claim 13, wherein the first lens group, the second lens group, the third lens group respectively comprise at least one glass lens.

16. The zoom lens according to claim 13, wherein the first lens group, the second lens group, and the third lens group respectively comprise at least one lens which has two aspherical surfaces, two free-form surfaces, or an aspherical surface and a free-form surface.

17. The zoom lens according to claim 13, wherein the second lens group comprises at least one doublet lens.

18. The zoom lens according to claim 13, further comprising a stop disposed between the first lens group and the second lens group, wherein the stop is moved with the second lens group during a zooming process.

* * * * *